United States Patent Office 3,029,249
Patented Apr. 10, 1962

3,029,249
PROCESS FOR THE PRODUCTION OF PHTHALO-
CYANINES AND METAL PHTHALOCYANINES
STABLE TO SEPARATION
Georg Geiger, Binningen, Baselland, Armando Geiger, Basel, and Xaver Pfister, Riehen, Switzerland, assignors to Sandoz Ltd. (also known as Sandoz A.G.), Basel, Switzerland
No Drawing. Filed May 9, 1960, Ser. No. 27,517
Claims priority, application Switzerland May 12, 1959
14 Claims. (Cl. 260—314.5)

The stability to separation of the pigments used for coloring lacquers is becoming increasingly important. The term refers to the separation of the white and the colored pigment particles which occurs in some nitrocellulose lacquers after standing for a short time. This phenomenon has an undesirable effect when the lacquer is poured or cast on the surface to be coated, or when the articles to be coated are dipped in the lacquer. If separation has taken place in the standing lacquer, the coatings formed by pouring or dipping techniques exhibit a much lighter shade than coatings applied by spraying and those of lacquers which are free from this type of flocculation. This phenomenon represents above all a loss of dyestuff, moreover, as a result of separation, the coatings produced by pouring or dipping show unpleasant mottled and/or stippled color effects.

This invention relates to a process for the production of phthalocyanines and metal phthalocyanines which are stable to separation. The process consists in reacting phthalocyanines or metal phthalocyanines which may be slightly halogenated, with vinyl compounds, if desired in presence of highly halogenated phthalocyanines or metal phthalocyanines.

The process can be carried out in such a way that the phthalocyanines or metal phthalocyanines which may be slightly halogenated are reacted with vinyl compounds, and the reaction products mixed with highly halogenated phthalocyanines or metal phthalocyanines.

The amount of vinyl compound employed is such that up to 20% but preferably 2% to 10% of the mixture is vinylated. The reaction is conducted to best advantage in concentrated sulfuric acid or concentrated phosphoric acid at temperatures of 30° to 150° C., but preferably 70–100° C.

A very simple mode of operation of the process is to dissolve the phthalocyanine or metal phthalocyanine, which may be slightly halogenated, in a mineral acid in presence of highly halogenated phthalocyanine or metal phthalocyanine, and to react the mixture with an amount of a vinyl compound sufficient to vinylate up to 10% of the mixture. To isolate the resulting mixture the reaction mass is run into water.

When phthalocyanines or metal phthalocyanines which may be slightly halogenated and have already been reacted up to 20% with vinyl compounds are mixed with highly halogenated phthalocyanines or metal phthalocyanines, phthalocyanines or metal phthalocyanines stable to separation are obtained. The mixing of these components can be carried out, e.g. in water, concentrated sulfuric acid, concentrated phosphoric acid, or in an organic medium, e.g. organic bases, preferably aniline, pyridine or pyridine bases of low or high boiling point, nitrated or chlorinated benzene derivatives, e.g. dichlorobenzene, nitrobenzene, ortho-nitrochlorobenzene, or in chlorinated naphthalenes.

Slightly halogenated phthalocyanines are, e.g. low chlorinated or low brominated phthalocyanines with 1 to 4 halogen atoms; metal phthalocyanines which may be slightly halogenated are chiefly copper, iron, cobalt, zinc, nickel, vanadium or magnesium phthalocyanines.

Highly halogenated phthalocyanines or metal phthalocyanines of primary interest are highly chlorinated phthalocyanines and highly halogenated phthalocyanines substituted by chlorine and bromine, or metal phthalocyanines with 13.5 to 16 halogen atoms. Of the highly halogenated metal phthalocyanines, copper phthalocyanine is the preferred type.

Suitable vinylating agents with which the slightly halogenated phthalocyanines and metal phthalocyanines or the mixtures are reacted are, e.g. acrylic acid, acrylonitrile or acrylic acid amide.

The phthalocyanines and metal phthalocyanines of the invention which are stable to separation are used preferably for coloring nitrocellulose lacquers. They also find employment for other purposes in the wide field of uses for pigment colors.

In the following examples the parts and percentages are by weight and the temperatures in degrees centigrade.

*Example 1*

The starting product is chlorinated copper phthalocyanine produced as follows:

240 parts of copper phthalocyanine are stirred into 1440 parts of sulfuric acid monohydrate at a temperature below 60°. The mass is cooled to 0–5° and 150 parts of 25% oleum, followed by 0.8 part of iodine, are added. A jet of chlorine is directed through the solution at the rate of about 5 parts per hour. After 7–10 hours a sample shows a chlorine content of 5.8%. The excess chlorine is then blown out of the solution by injecting air into it.

The reaction mass is diluted with 210 parts of 96% sulfuric acid, and at 20° 4.8 parts of acrylonitrile are added and the whole heated at 80–85° for 16 hours. On cooling to 60° the mass is run with vigorous stirring into 10,000 parts of water. The precipitated pigment is filtered with suction, washed neutral with water and suspended in 3000 parts of water. The suspension is made alkaline with about 20 parts of 30% sodium hydroxide solution, then stirred about 15 minutes at 90–95°, the pigment filtered with suction, washed neutral with water, and dried.

The blue pigment thus obtained is stable to separation.

*Example 2*

10 parts of monochlorocopper phthalocyanine, produced as described in Example 1, are dissolved in 180 parts of sulfuric acid monohydrate and at 20° 1 part of acrylic acid amide is added. The mass is stirred for several hours at 80–85°, then cooled to 20° and run with stirring into 1000 parts of water. The precipitated pigment is filtered off, washed neutral and dried. It is blue and stable to separation.

When the 10 parts of monochlorocopper phthalocyanine of this example are replaced by 10 parts of di-, tri- or tetrachloro- or mono-, di-, tri- or tetrabromocopper phthalocyanine, the resulting pigments show the same good stability to separation.

*Example 3*

20 parts of crude copper phthalocyanine are dissolved in 370 parts of sulfuric acid monohydrate at 100°. After careful addition of 10 parts of acrylic amide the solution is heated at 100° for 5 hours with stirring. On cooling, the reacted copper phthalocyanine is precipitated on 2000 parts of ice. The precipitate is filtered with suction and washed neutral.

10 parts of the 10% filter cake thus obtained are mixed with 60 parts of a 30% filter cake of polychlorocopper phthalocyanine of 48.5% chlorine content, produced by chlorinating copper phthalocyanine in an aluminium chloride-sodium chloride melt and discharging the melt onto water. The mixture is stirred into 44 parts of aniline and heated at 80° for 10 hours. 40 parts of water and 65 parts of 30% hydrochloric acid are run into the mixture. After stirring for 1 hour at 80° all the aniline is converted into chlorohydrate. The pigment is filtered with suction and washed neutral with hot water. The dried, powdered pigment gives green shades of good color strength in nitrocellulose lacquers and is free from separation.

This mixing process can also be carried out with good success in pyridine, pyridine bases of low or high boiling point, dichlorobenzene, nitrobenzene, ortho-nitrobenzene or chloronaphthalene. After mixing, these solvents are best removed by steam distillation. The pigments obtained are stable to separation.

When the 20 parts of copper phthalocyanine used in Example 3 are replaced by 20 parts of cobalt, nickel or vanadium phthalocyanine and the procedure described in Example 3 is followed, further pigments stable to separation in nitrocellulose lacquers are obtained.

When the 20 parts of copper phthalocyanine used in Example 3 are replaced by 20 parts of zinc phthalocyanine and vinylated for 5 hours at 120°, the procedure being otherwise the same as that of Example 3, the pigment obtained is again stable to separation in nitrocellulose lacquers.

Example 4

20 parts of tetrachlorocopper phthalocyanine, produced by condensation of a mixture of 1 mole of tetrachlorophthalic anhydride and 3 moles of phthalic anhydride with copper chloride and urea by the known methods, is reacted with acrylic amide as described in Example 3.

2 parts of the vinylated, slightly chlorinated phthalocyanine thus obtained are dissolved at 70° in 110 parts of sulfuric acid monohydrate and 27 parts of oleum 25%, together with 18 parts of hexadecachlorocopper phthalocyanine, produced as described in Swiss Patent 238,337. After the additions have dissolved the mixture is allowed to cool and run into 2500 parts of ice water. The precipitate is filtered with suction, washed neutral and dried. In nitrocellulose lacquers the pigment shows greatly improved stability to separation as compared with the pure hexadecachlorocopper phthalocyanine.

Example 5

5 parts of crude vanadium phthalocyanine and 100 parts of crude hexadecachlorocopper phthalocyanine, produced according to the procedure given in Example 4, are dissolved together in 1800 parts of sulfuric acid monohydrate. The solution is heated to 100° and after careful addition of 10 parts of acrylic amide is maintained at 100° for 7 hours. On cooling the solution is run onto 5000 parts of ice, upon which the precipitate is filtered with suction and washed neutral. The dried, powdered green pigment is stable to separation in nitrocellulose lacquers.

When the 5 parts of vanadium phthalocyanine are replaced by 5 parts of copper, cobalt or nickel phthalocyanine and the procedure of Example 5 is followed, other pigments of greatly improved stability to separation are obtained.

Example 6

The 5 parts of vanadium phthalocyanine of Example 5 are replaced by 10 parts of crude nickel phthalocyanine and the solvent of that example by concentrated phosphoric acid. Vinylation is carried out for 7 hours at 140°, the procedure being otherwise the same as described in Example 5. The product is a pigment of improved stability to separation in nitrocellulose lacquers.

Example 7

20 parts of monochlorocopper phthalocyanine, produced by chlorination of copper phthalocyanine in concentrated sulfuric acid by the process of French Patent 1,218,935, are reacted with acrylic amide according to the procedure described in Example 3.

10 parts of the 10% filter cake obtained are mixed with 60 parts of a 30% filter cake of hexadecachlorocopper phthalocyanine, produced as described in Example 3 and precipitated from concentrated sulfuric acid. The mixture is stirred in 250 parts of water for 30 minutes at 80°, then filtered with suction and dried. The green shades given by the pigment in nitrocellulose lacquers show considerably better stability to separation.

Example 8

A nitrocellulose lacquer can be colored as follows:

(a) *Preparation of pigment paste.*—1 part of the pigment of Example 1 and 2 parts of Paraplex RG8 are ground on the Hoover Automatic Muller for 200 revolutions. After 100 revolutions the paste is scraped together and recharged into the mixer.

(b) *Preparation of lacquer.*—1.5 parts of the pigment paste are weighed into a glass beaker. 50 parts of Nason Automotive Paint 5228 White are added in portions with stirring and the whole homogenized with a polyethylene spatula. Finally 24 parts of Nason Automotive Paint Diluter are added to dilute the lacquer to spraying consistency.

(c) *Coloring.*—Half of the colored lacquer is applied to white cardboard with a spray gun. On drying, 5 cc. of the well stirred lacquer is poured over the other half of the cardboard. No difference in depth of color can be seen between the sprayed and the cast surfaces.

Having thus disclosed the invention what we claim is:

1. A process for the production of stable metal phthalocyanines which comprises heating and thereby reacting a mixture of a halogenated metal phthalocyanine containing up to 4 halogen atoms in the molecule, wherein the halogen atoms are selected from the group consisting of chlorine and bromine atoms, with a vinyl compound selected from the group consisting of acrylic acid acrylonitrile and acrylic acid amide, at a temperature between 30° and 150° C. in concentrated sulfuric acid; said vinyl compound being employed in such amount that up to 20% of the said mixture is vinylated.

2. A process according to claim 1, in which the amount of vinyl compound employed is such that from 2 up to 10% of the mixture is vinylated.

3. A process for the production of stable metal phthalocyanines which comprises heating and thereby reacting a mixture of a halogenated metal phthalocyanine containing up to 4 halogen atoms in the molecule, wherein the halogen atoms are selected from the group consisting of chlorine and bromine atoms, with a vinyl compound selected from the group consisting of acrylic acid, acrylonitrile and acrylic acid amide, at a temperature between 70° and 150° C. in concentrated sulfuric acid; said vinyl compound being employed in such amount that up to 20% of the said mixture is vinylated.

4. A process for the production of stable metal phthalocyanines which comprises heating and thereby reacting a mixture of a halogenated metal phthalocyanine containing up to 4 halogen atoms in the molecule, wherein the halogen atoms are selected from the group consisting of chlorine and bromine atoms, and wherein the metal is a member selected from the group consisting of copper, iron, cobalt, zinc, nickel, vanadium and magnesium, with a vinyl compound selected from the group consisting of acrylic acid, acrylonitrile and acrylic acid amide, at a temperature between 30° and 150° C. in concentrated sulfuric acid; said vinyl compound being employed in such amount that up to 20% of the said mixture is vinylated.

5. A process for the production of stable metal phthalocyanines which comprises heating and thereby reacting a mixture of a halogenated metal phthalocyanine containing up to 4 halogen atoms in the molecule, wherein the halogen atoms are selected from the group consisting of chlorine and bromine atoms, with a vinyl compound selected from the group consisting of acrylic acid, acrylonitrile and acrylic acid amide, and with a highly halogenated phthalocyanine selected from the group consisting of phthalocyanines and metal phthalocyanines having from about 13.5 to 16 halogen atoms per molecule and wherein the halogen atoms are selected from the group consisting of chlorine and bromine atoms, at a temperature between 30° and 150° C. in concentrated sulfuric acid; said vinyl compound being employed in such amount that up to 20% of the said mixture is vinylated.

6. A process for the production of stable metal phthalocyanines which comprises heating and thereby reacting a mixture of a halogenated metal phthalocyanine containing up to 4 halogen atoms in the molecule, wherein the halogen atoms are selected from the group consisting of chlorine and bromine atoms, with a vinyl compound selected from the group consisting of acrylic acid, acrylonitrile and acrylic acid amide, at a temperature between 30° and 150° C. in concentrated sulfuric acid, and mixing the resulting reaction product with a highly halogenated phthalocyanine selected from the group consisting of phthalocyanines and metal phthalocyanines having from about 13.5 to 16 halogen atoms per molecule and wherein the halogen atoms are selected from the group consisting of chlorine and bromine atoms, at a temperature between 30° and 150° C. in concentrated sulfuric acid; said vinyl compound being employed in such amount that up to 20% of the said mixture is vinylated.

7. A process for the production of stable metal phthalocyanines which comprises heating and thereby reacting a mixture of a halogenated metal phthalocyanine containing up to 4 halogen atoms in the molecule, wherein the halogen atoms are selected from the group consisting of chlorine and bromine atoms, with a vinyl compound selected from the group consisting of acrylic acid, acrylonitrile and acrylic acid amide, and with a highly halogenated metal phthalocyanine having from about 13.5 to 16 halogen atoms per molecule and wherein the halogen atoms are selected from the group consisting of chlorine and bromine atoms, at a temperature between 30° to 150° C. in concentrated sulfuric acid; said vinyl compound being employed in such amount that up to 20% of the said mixture is vinylated.

8. A process for the production of stable metal phthalocyanines which comprises heating and thereby reacting a mixture of a halogenated metal phthalocyanine containing up to 4 halogen atoms in the molecule, wherein the halogen atoms are selected from the group consisting of chlorine and bromine atoms, with acrylic acid amide at a temperature between 30° and 150° C. in concentrated sulfuric acid; acrylic acid amide being employed in such amount that up to 20% of the said mixture is vinylated.

9. A process for the production of stable metal phthalocyanines which comprises heating and thereby reacting a mixture of a halogenated metal phthalocyanine containing up to 4 halogen atoms in the molecule, wherein the halogen atoms are selected from the group consisting of chlorine and bromine atoms, with acrylic acid at a temperature between 30° and 150° C. in concentrated sulfuric acid; acrylic acid being employed in such amount that up to 20% of the said mixture is vinylated.

10. A process for the production of stable metal phthalocyanines which comprises heating and thereby reacting a mixture of a halogenated metal phthalocyanine containing up to 4 halogen atoms in the molecule, wherein the halogen atoms are selected from the group consisting of chlorine and bromine atoms, with acrylonitrile at a temperature between 30° and 150° C. in concentrated sulfuric acid; acrylonitrile being employed in such amount that up to 20% of the said mixture is vinylated.

11. A process for the production of stable metal phthalocyanines which comprises heating and thereby reacting a mixture of a halogenated metal phthalocyanine containing up to 4 halogen atoms in the molecule, wherein the halogen atoms are selected from the group consisting of chlorine and bromine atoms, with acrylic acid, and with a highly halogenated phthalocyanine selected from the group consisting of phthalocyanines and metal phthalocyanines having from about 13.5 to 16 halogen atoms per molecule and wherein the halogen atoms are selected from the group consisting of chlorine and bromine atoms, at a temperature between 30° and 150° C. in concentrated sulfuric acid; acrylic acid being employed in such amount that up to 20% of the said mixture is vinylated.

12. A process for the production of stable metal phthalocyanines which comprises heating and thereby reacting a mixture of a halogenated metal phthalocyanine containing up to 4 halogen atoms in the molecule, wherein the halogen atoms are selected from the group consisting of chlorine and bromine atoms, with acrylic acid amide, and with a highly halogenated phthalocyanine selected from the group consisting of phthalocyanines and metal phthalocyanines having from about 13.5 to 16 halogen atoms per molecule and wherein the halogen atoms are selected from the group consisting of chlorine and bromine atoms, at a temperature between 30° and 150° C. in concentrated sulfuric acid; acrylic acid amide being employed in such amount that up to 20% of the said mixture is vinylated.

13. A process for the production of stable metal phthalocyanines which comprises heating and thereby reacting a mixture of a halogenated metal phthalocyanine containing up to 4 halogen atoms in the molecule, wherein the halogen atoms are selected from the group consisting of chlorine and bromine atoms, with acrylonitrile, and with a highly halogenated phthalocyanine selected from the group consisting of phthalocyanines and metal phthalocyanines having from 13.5 to 16 halogen atoms per molecule and wherein the halogen atoms are selected from the group consisting of chlorine and bromine atoms, at a temperature between 30° and 150° C. in concentrated sulfuric acid; acrylonitrile being employed in such amount that up to 20% of the said mixture is vinylated.

14. A process for the production of stable metal phthalocyanines which comprises heating and thereby reacting a mixture of a halogenated metal phthalocyanine containing up to 4 halogen atoms in the molecule, wherein the halogen atoms are selected from the group consisting of chlorine and bromine atoms, with a vinyl compound selected from the group consisting of acrylic acid, acrylonitrile and acrylic acid amide, at a temperature between 30° and 150° C. in concentrated sulfuric acid, and mixing the resulting reaction product with a highly halogenated phthalocyanine selected from the group consisting of phthalocyanines and metal phthalocyanines having from about 13.5 to 16 halogen atoms per molecule and wherein the halogen atoms are selected from the group consisting of chlorine and bromine atoms, at a temperature between 30° and 150° C.; said vinyl compound being employed in such amount that up to 20% of the said mixture is vinylated.

References Cited in the file of this patent

UNITED STATES PATENTS 2,327,472     Vesce et al. _____ Aug. 24, 1943